US012531366B2

(12) United States Patent
Kim

(10) Patent No.: US 12,531,366 B2
(45) Date of Patent: Jan. 20, 2026

(54) CONNECTOR INCLUDING COOLING FAN

(71) Applicant: LG Energy Solution, Ltd., Seoul (KR)

(72) Inventor: Sung-Gyu Kim, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 448 days.

(21) Appl. No.: 18/020,460

(22) PCT Filed: Aug. 17, 2021

(86) PCT No.: PCT/KR2021/010897
§ 371 (c)(1),
(2) Date: Feb. 9, 2023

(87) PCT Pub. No.: WO2022/085912
PCT Pub. Date: Apr. 28, 2022

(65) Prior Publication Data
US 2023/0318225 A1 Oct. 5, 2023

(30) Foreign Application Priority Data
Oct. 20, 2020 (KR) .................. 10-2020-0136066

(51) Int. Cl.
H01R 13/533 (2006.01)
G01K 3/00 (2006.01)
H01R 13/66 (2006.01)
(52) U.S. Cl.
CPC .......... H01R 13/533 (2013.01); G01K 3/005 (2013.01); H01R 13/6683 (2013.01)
(58) Field of Classification Search
CPC ... H01R 13/533; H01R 13/6683; G01K 3/005
(Continued)

(56) References Cited

U.S. PATENT DOCUMENTS 8,007,228 B2 * 8/2011 Wang ................. H05K 7/20181
415/48
2007/0061020 A1 * 3/2007 Bovee ................. H04L 12/2823
700/20
(Continued)

FOREIGN PATENT DOCUMENTS

CN 106099548 A 11/2016
CN 209675520 U 11/2019
(Continued)

OTHER PUBLICATIONS

International Search Report for Application No. PCT/KR2021/010897 mailed Nov. 24, 2021, pp. 1-3.
(Continued)

Primary Examiner — Harshad C Patel
(74) Attorney, Agent, or Firm — Lerner David LLP

(57) ABSTRACT

A connector for large current according to the present disclosure includes: a terminal member capable of large current transmission; a connector housing in which the terminal member is accommodated; a temperature sensor attached to the terminal member; a fan unit provided in the connector housing, and configured to operate when a temperature of the terminal member is higher than a preset threshold temperature; and an exhaust cover provided on a side of the connector housing and opened/closed by wind pressure when the fan unit operates.

10 Claims, 4 Drawing Sheets

(58) Field of Classification Search
USPC .......................................................... 439/485
See application file for complete search history.

(56) References Cited

U.S. PATENT DOCUMENTS

| | | | |
|---|---|---|---|
| 2010/0031737 A1* | 2/2010 | Saito ..................... | G01F 1/6842 |
| | | | 73/114.34 |
| 2016/0039297 A1 | 2/2016 | Kretschmer et al. | |
| 2017/0290195 A1* | 10/2017 | Jansen ................... | H01R 24/76 |
| 2018/0048090 A1 | 2/2018 | Kawai et al. | |
| 2019/0131744 A1 | 5/2019 | Blakborn | |
| 2019/0326762 A1* | 10/2019 | Zoon ..................... | B60L 53/302 |
| 2019/0387639 A1 | 12/2019 | Jansen et al. | |
| 2021/0281020 A1 | 9/2021 | Kropiewnicki | |

FOREIGN PATENT DOCUMENTS

| | | | |
|---|---|---|---|
| EP | 1777606 | A2 | 4/2007 |
| EP | 1962387 | A2 | 8/2008 |
| JP | H10118169 | A | 5/1998 |
| JP | H1141712 | A | 2/1999 |
| JP | 2009266418 | A | 11/2009 |
| JP | 5125723 | B2 | 1/2013 |
| JP | 2016039147 | A | 3/2016 |
| JP | 2018006701 | A | 1/2018 |
| JP | 2018026288 | A | 2/2018 |
| KR | 101460501 | B1 | 11/2014 |
| KR | 20160001084 | U | 4/2016 |
| KR | 101760708 | B1 | 7/2017 |
| KR | 20190037332 | A | 4/2019 |
| WO | 2017/172405 | A1 | 10/2017 |

OTHER PUBLICATIONS

Extended European Search Report for Application No. 21882985.1 dated Dec. 5, 2023. 9 pgs.

* cited by examiner

CONNECTOR INCLUDING COOLING FAN

CROSS REFERENCE TO RELATED APPLICATIONS

The present application is a national phase entry under 35 U.S.C. § 371 of International Application No. PCT/KR2021/010897 filed Aug. 17, 2021 which claims priority to Korean Patent Application No. 10-2020-0136066 filed on Oct. 20, 2020 in the Republic of Korea, the disclosures of which are incorporated herein by reference.

TECHNICAL FIELD

The present disclosure relates to a connector, and more particularly, relates to a connector including a cooling fan therein and capable of cooling a connector terminal when a temperature of the connector terminal rises by automatically controlling the cooling fan.

BACKGROUND ART

Recently, secondary batteries have been widely used as driving or energy storages not only for small devices such as portable electronic devices but also for large and medium devices such as electric vehicles. Secondary batteries are provided in a battery pack and mounted on a large or medium device. In this case, in order to increase the capacity and output of the battery pack, a lot of secondary batteries are electrically connected in the battery pack. A plurality of secondary batteries are accommodated in one module case to constitute one battery module, and one or more battery modules are accommodated in one pack case to constitute one battery pack.

A battery pack is connected to a load or a charger through a connector. The load refers to a device that receives power from the battery pack, for example, a motor or an inverter of an electric vehicle. The electric vehicle requires a high voltage of 300 V or more and a large current of tens to hundreds of amperes (A). Accordingly, a connector for power supply which is capable of withstanding high heat is used to connect the battery pack to the load.

However, as large current is continuously supplied, heat may intensify at a contact portion of the connector for power supply, which may lead to a decrease in power efficiency and a risk of fire. Accordingly, there is a demand for a method of appropriately managing a temperature of a connector for power supply.

SUMMARY

Technical Problem

The present disclosure is designed to solve the problems of the related art, and therefore the present disclosure is directed to providing a connector including a cooling device capable of cooling the connector for large current transmission when a temperature of the connector rises.

However, technical problems to be solved by the present disclosure are not limited to the above-described technical problems and one of ordinary skill in the art will understand other technical problems from the following description.

Technical Solution

A connector for large current according to an embodiment of the present disclosure includes: a terminal member capable of large current transmission; a connector housing in which the terminal member is accommodated; at least one temperature sensor attached to the terminal member; a fan unit provided in the connector housing, and configured to operate when a temperature of the terminal member is higher than a preset threshold temperature; and an exhaust cover provided on a side of the connector housing and configured to be opened/closed by wind pressure when the fan unit operates.

A controller connected to the temperature sensor and the fan unit and configured to turn on/off the fan unit based on temperature data sensed by the temperature sensor may be located in the connector housing.

The controller may be further configured to, in response to a temperature of the terminal member reaching a threshold temperature predefined as a dangerous level, transmit a warning sound or a danger signal to an external device.

The controller may be implemented as a printed circuit board.

The connector housing may include: a bottom cover including a space in which the terminal member and the fan unit under the terminal member are provided; and a top cover coupled to the top of the bottom cover and having an inner surface on which the controller is fixedly mounted.

The connector for large current may further include an indicator light electrically connected to the controller, located in a hole formed in the top cover, and configured to indicate a temperature state of the terminal member.

The bottom cover may include a ventilation hole in a portion corresponding to a lower portion of the fan unit, and the exhaust cover may be configured to cover the ventilation hole.

The exhaust cover may be coupled to the bottom cover with a damper hinge.

The damper hinge may be configured such that a torque is applied in a direction in which the exhaust cover is closed, wherein the torque has a value less than wind pressure when the fan unit is at a lowest speed.

The connector for large current may further include a suction member provided in an outer portion of the ventilation hole where an edge of the exhaust cover contacts the bottom cover.

According to another aspect of the present disclosure, there is provided a battery pack including the connector for large current.

Advantageous Effects

According to an aspect of the present disclosure, a connector for large current including a cooling device capable of cooling the connector for large current transmission when a temperature of the connector rises may be provided.

The connector for large current according to the present disclosure includes a temperature sensor, a cooling fan, and a printed circuit board (controller) capable of controlling the temperature sensor and the cooling fan, and when a terminal reaches a certain temperature, the cooling fan automatically operates to cool the terminal. Also, when a temperature of the terminal is equal to or higher than a dangerous temperature, the printed circuit board may transmit a signal to an external device (e.g., a battery management system (BMS)) to cut off power supply and ensure safety.

The effects of the present disclosure are not limited to the effects mentioned above, and other effects not mentioned will be clearly understood by one of ordinary skill in the art from the specification and the attached drawings.

DETAILED DESCRIPTION

Figure 1:
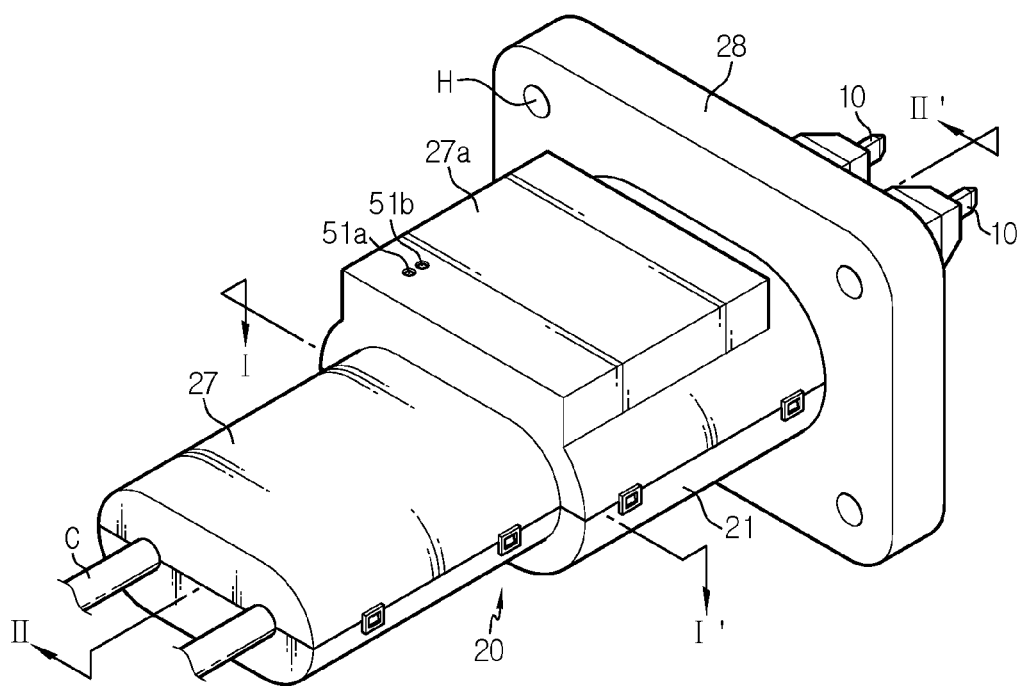
FIG. 1 is a perspective view illustrating a connector for large current, according to an embodiment of the present disclosure.

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the present disclosure, so it should be understood that other equivalents and modifications could be made thereto without departing from the scope of the present disclosure.

These embodiments are provided so that this disclosure will be thorough and complete, and will fully convey the scope of the present disclosure to one of ordinary skill in the art. Accordingly, the thickness and size of each element shown in the drawings may be exaggerated, omitted or schematically drawn for the purpose of clarity. Accordingly, the size of each element does not utterly reflect an actual size or ratio.

A connector for large current according to the present disclosure which is a component applied to a battery pack may be used to supply power of the battery pack to an inverter or a motor of an electric vehicle. The following is described assuming that a connector for large current is used to supply a high voltage and large current of a battery pack to a load of an electric vehicle.

However, a connector for large current according to the present disclosure should not be limited to being used one of components of a battery pack. That is, the connector for large current according to the present disclosure may be used to electrically connect a power supply and a device, a device and a device, or internal units of a device, rather than a battery pack.

Figure 2:
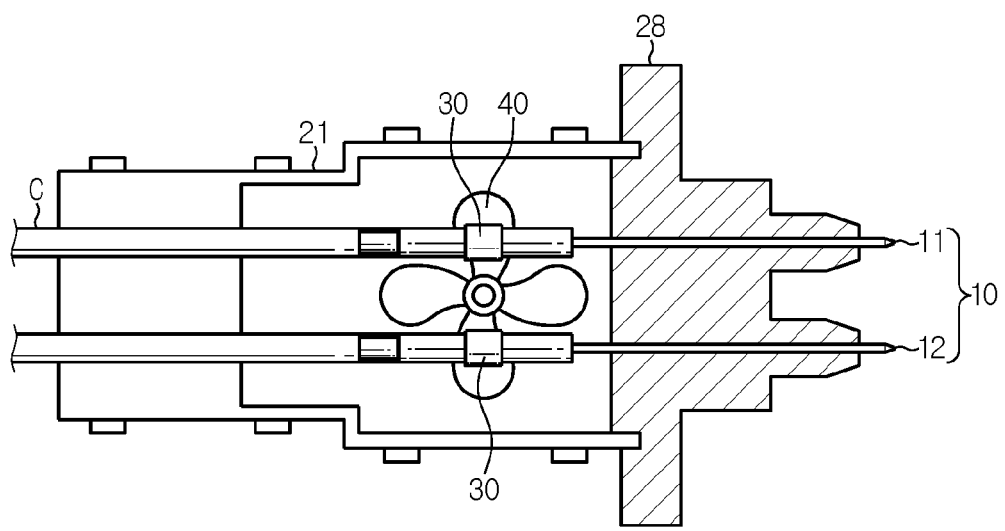
FIG. 2 is a cross-sectional view illustrating the connector for large current, taken along line I-I' of FIG. 1.
Figure 3:
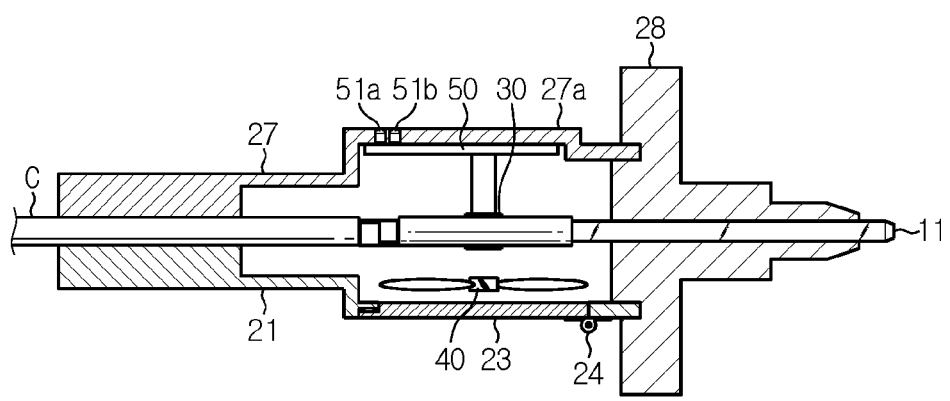
FIG. 3 is a longitudinal sectional view illustrating the connector for large current, taken along line II-IP of FIG. 1.

FIG. 1 is a perspective view illustrating a connector for large current, according to an embodiment of the present disclosure. FIG. 2 is a cross-sectional view illustrating the connector for large current, taken along line I-I' of FIG. 1. FIG. 3 is a longitudinal sectional view illustrating the connector for large current, taken along line II-II' of FIG. 1.

Referring to FIGS. 1 through 4, a connector for large current according to an embodiment of the present disclosure includes a terminal member 10, a connector housing 20, a temperature sensor 30, a fan unit 40, a controller 50, and an exhaust cover 23.

The terminal member 10 includes a positive electrode terminal 11 and a negative electrode terminal 12, and is electrically connected to a terminal of another connector of a battery pack, and functions as a passage through which large current flows. Although the terminal member 10 of the present embodiment is a straight pin-shaped member to be connected or disconnected in a plug-in method to and from a terminal of the battery pack, this is merely an example and the terminal member 10 may be changed into any of various shapes according to a connection method of a pair of male/female connectors.

The connector housing 20 that forms the exterior of the connector for large current may accommodate the terminal member 10 therein and may allow a high-voltage cable C connected to the terminal member 10 to be drawn rearward.

The connector housing 20 of the present embodiment includes a bottom cover 21, a top cover 27, and a flange 28.

The bottom cover 21 may be provided to seat and fix the terminal member 10, and the top cover 27 may be coupled to the top of the bottom cover 21. The bottom cover 21 and the top cover 27 may be snap-fit fastened, and an adhesive may be located at an interface between the bottom cover 21 and the top cover 27.

The fan unit 40 may be provided in a space between the terminal member 10 and a bottom surface of the bottom cover 21, and a ventilation hole 22 may be formed in the bottom surface of the bottom cover 21. The ventilation hole 22 is closed by the exhaust cover 23 in a normal situation.

The top cover 27 may be provided so that the controller 50 is mounted on a portion of an inner surface corresponding to a vertical upper portion of the terminal member 10. For example, the controller 50 may be implemented as a printed circuit board, and a portion 27a of the top cover 27 corresponding to the vertical upper portion of the terminal member 10 may have a shape matching the printed circuit board.

The flange 28 may be coupled to the front of the bottom cover 21 and the top cover 27. The flange 28 may include a block portion into which the positive electrode terminal 11 and the negative electrode terminal 12 are fixedly inserted, and a bracket portion surrounding front portions of the bottom cover 21 and the top cover 27. Holes H into which bolts may be inserted may be formed in corner regions of the bracket portion. For example, the connector for large current may be connected to another connector of the battery pack, and then the connector for large current may be fixed to a housing (not shown) of the other connector with bolts that may be inserted into the holes H of the flange 28.

The temperature sensor 30 for monitoring a temperature change of the terminal member 10 may include a positive temperature coefficient (PTC) thermistor whose resistance increases as temperature increases or a negative temperature coefficient (NTC) thermistor whose resistance decreases as temperature increases.

The thermistor functions as a sensor for converting a thermal signal into an electrical signal, which is well known in the art and thus a detailed description thereof will be omitted.

The temperature sensor 30 is attached to the terminal member 10. In the present embodiment, two temperature sensors 30 may be provided, may be respectively attached to surround at least portions of the positive electrode terminal 11 and the negative electrode terminal 12, and may be connected by a wire to the controller 50. The temperature sensors 30 sense temperatures of the positive electrode terminal 11 and the negative electrode terminal 12 when large current flows and transmit information about the temperatures to the controller 50.

The controller 50 may be configured to perform a control function of turning on/off the fan unit 40 based on temperature data sensed by the temperature sensor 30.

For example, the controller 50 may be connected to the fan unit 40 to transmit power and a signal by a wire (not shown), and may be configured to compare the temperature data sensed by the temperature sensor 30 with a preset threshold temperature, and when the temperature data is higher than the threshold temperature, apply driving power and a signal for operating the fan unit 40 to the fan unit 40.

The threshold temperature that is a temperature at which power efficiency is likely to decrease as a terminal temperature rises may be experimentally determined according to a material and a size of the terminal member 10, a magnitude of large current, etc.

Also, the controller 50 may be configured to transmit a warning sound or a danger signal to an external device, when a temperature of the terminal member 10 reaches a dangerous temperature set as a dangerous level.

The dangerous temperature set as the dangerous level that is a high temperature at which the connector housing 20 is likely to start fire due to heat of the terminal member 10 may be experimentally determined according to materials of the terminal member 10 and the connector housing 20, etc.

For example, when temperatures of the positive electrode terminal 11 and the negative electrode terminal 12 continuously rise and reach a dangerous temperature (e.g., 100° C.), the controller 50 may transmit a danger signal to a battery management system (BMS) so that the BMS opens a contact point of a main relay device based on the danger signal to block the flow of large current.

The controller 50 may be implemented as a printed circuit board, and a processor, an application-specific integrated circuit (ASIC), another chipset, a logic circuit, a register, a communication modem, and a data processing device known in the art may be selectively provided on the printed circuit board.

Indicator lights 51a, 51b may be provided on the top cover 27. The indicator lights 51a, 51b for indicating a temperature state of the terminal member 10 may be electrically connected to the printed circuit board and may be located in holes formed in the top cover 27.

For example, the indicator lights 51a, 51b may include a red indicator light 51a and a green indicator light 51b, and the green indicator light 51b may be controlled to emit light when a temperature of the terminal member 10 is lower than the preset threshold temperature and the red indicator light 51a may be controlled to emit light when a temperature of the terminal member 10 is equal to or higher than the preset threshold temperature. A user may know whether a temperature of the terminal member 10 is currently in a normal range or an abnormal range by looking at whether the indicator lights 51a, 51b emit light. When the fan unit 40 does not operate even though the red indicator light 52a emits light, the controller 50 or the fan unit 40 has a problem, and thus necessary measures should be taken rapidly.

In the connector for large current according to the present disclosure, in order to more effectively and rapidly cool the terminal member 10 by using the fan unit 40 when a high voltage/large current flows, the fan unit 40 is located in the connector housing 20.

As such, when the fan unit 40 is located in the connector housing 20, the ventilation hole 22 for discharging hot air to the outside when the fan unit 40 operates is required. Accordingly, in the present embodiment, the ventilation hole 22 is provided in a portion of the bottom cover 21 corresponding to a lower portion of the fan unit 40.

However, the ventilation hole 22 may function as a passage through which a fluid or dust may be introduced into the connector housing 20. Accordingly, the connector for large current of the present disclosure includes the exhaust cover 23 configured to usually close the ventilation hole 22 and to be selectively opened when the fan unit 40 operates.

Figure 4:
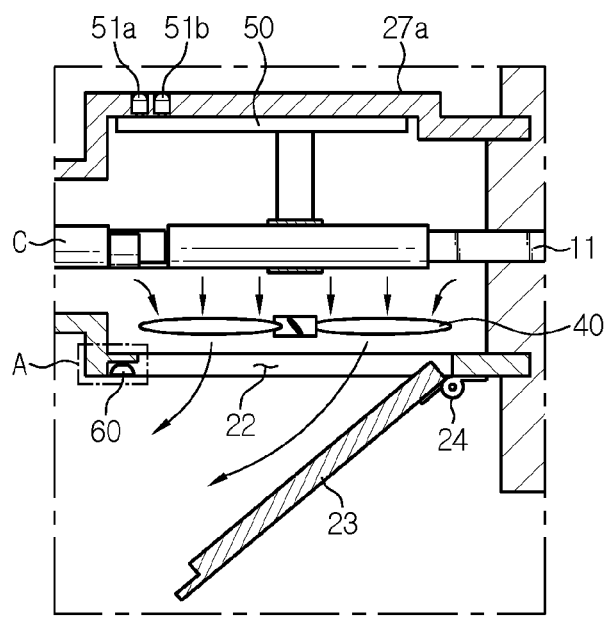
FIG. 4 is a view illustrating a cooling structure of the connector for large current, according to an embodiment of the present disclosure.

For example, the exhaust cover 23 may be configured to maintain a closed state during a normal situation by being coupled to the bottom cover 21 with a damper hinge 24 and to be opened by wind pressure as shown in FIG. 4 when the fan unit 40 operates.

The damper hinge 24 may include a damper and two metal pieces. The damper may include a main body that forms the exterior, a vain provided in the main body, silicone oil, and a rotating shaft connected to the vain and extending to the inside and the outside of the main body, and may be configured to apply a torque of a certain magnitude to the rotating shaft. The two metal pieces may be connected to the rotating shaft of the damper and may be configured to rotate in a direction in which the torque is applied.

One of the two metal pieces of the damper hinge 24 is fixedly coupled to an outer surface of the bottom cover 21, and the remaining one is fixedly coupled to the exhaust cover 23. In this case, when a torque direction of the damper hinge 24 is set to a direction in which the exhaust cover 23 is closed, during a normal situation, a state in which the ventilation hole 22 is closed by the exhaust cover 23 may be usually maintained due to the torque of the damper hinge 24.

When a maximum torque of the damper hinge 24 is set to be less than wind pressure at a lowest speed of the fan unit 40, the exhaust cover 23 may be opened by wind pressure when the fan unit 40 operates, and thus hot air in the connector housing 20 may be discharged through the ventilation hole 22 to the outside. Next, when a temperature of the terminal member 10 returns to a normal temperature, the operation of the fan unit 40 may be stopped, and in this case, the exhaust cover 23 may return to its original position due to the torque of the damper hinge 254 to close the ventilation hole 22 again.

Figure 5:
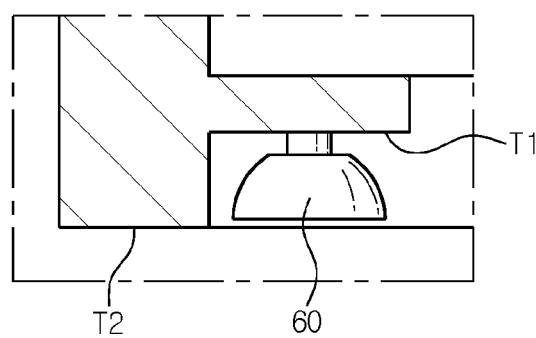
FIG. 5 is an enlarged view illustrating a portion A of FIG. 4.

As shown in FIGS. 4 and 5, a suction member 60 may be further provided in an outer portion of the ventilation hole 22 where an edge of the exhaust cover 23 contacts the bottom cover 21. The suction member 60 may hold the exhaust cover 23 to prevent repeated opening/closing of the exhaust cover 23 during impact or vibration.

The suction member 60 may be formed of a silicone material and may be provided in a suction cup shape capable of vacuum suction. To secure a space for the suction member 60 and improve sealing properties of the corresponding portion, the outer portion of the ventilation hole 22 may have stepped surfaces T1, T2, and the edge of the exhaust cover 23 may be formed to correspond to the stepped surfaces T1, T2.

As such, although the damper hinge 24 is used and the exhaust cover 23 is opened/closed by wind pressure when the fan unit 40 operates in the present embodiment, a method of using a coil spring, instead of the damper hinge 24, may be considered.

Figure 6:
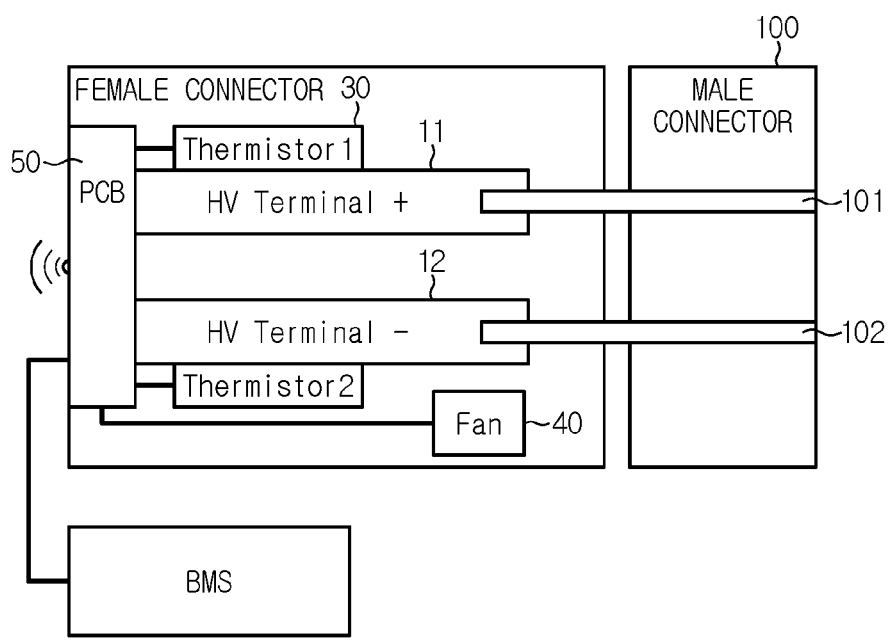
FIG. 6 is a view illustrating main elements of the connector for large current, according to an embodiment of the present disclosure.

Next, an operating mechanism of the connector for large current according to an embodiment of the present disclosure will be briefly described with reference to FIG. 6.

The connector for large current may be connected to another power connector 100 provided on a side of the battery pack. The power connector 100 forms a female/male pair with the connector for large current of the present embodiment, and may include a positive electrode plug 101 and a negative electrode plug 102 that may be respectively electrically connected to the positive electrode terminal 11 and the negative electrode terminal 12.

The positive/negative electrode plug and the positive/negative electrode terminal 11, 12 are connected, a high voltage/large current flows through the positive/negative electrode terminal 11, 12, and a temperature of a contact portion therebetween starts to rise.

A temperature change of the positive/negative electrode terminal 11, 12 is sensed by the temperature sensor 30 and is sent to the controller 50. The controller 50 may monitor a temperature change of the positive/negative electrode terminal 11, 12 in real time and may transmit the temperature change to an external device or a BMS. In this case, the controller 50 and the external device or the BMS may be configured to transmit and receive a signal by wire or wirelessly.

When a temperature of the positive/negative electrode terminal 11, 12 is equal to or higher than a certain temperature, that is, the preset threshold temperature, the fan unit 40 is operated by the controller 50. In this case, a rotation speed of the fan unit 40 may be set to be increased or decreased by the controller 50 based on temperature data.

Accordingly, a temperature of the positive/negative electrode terminal 11, 12 may be lowered again below the threshold temperature, and thus resistance loss may be reduced and efficiency of power supplied to a load such as an electric vehicle may be improved.

Also, when a temperature of the positive/negative electrode terminal 11, 12 rapidly increases, or continuously increases and reaches a dangerous temperature despite an operation of the fan unit 40, the controller 50 transmits a current blocking signal to the BMS for safety. In this case, the BMS blocks current flowing to the connector for large current by controlling a relay device or the like.

According to the configuration and the operation of the connector for large current according to an embodiment of the present disclosure as described above, the terminal member 10 may be cooled to an appropriate temperature during transmission of large current, thereby reducing resistance loss and improving power efficiency. Also, in an abnormal situation, necessary measures such as blocking current may be taken by the connector for large current by applying a danger signal to an external device (e.g., the BMS).

A battery pack according to the present disclosure may include one or more connectors for large current described above. The battery pack may include a battery module including a plurality of battery cells that are electrically connected to one another, a pack case in which one or more battery modules may be accommodated, and various devices for controlling charging/discharging of the battery module such as a BMS, a relay, a current sensor, and a fuse, in addition the connector for large current.

The battery pack may be applied to a vehicle such as an electric vehicle or a hybrid vehicle. The battery pack may also be applied to a power storage device or other IT products.

While one or more embodiments of the present disclosure have been described with reference to the figures, the present disclosure is not limited to the above-described specific embodiments, and it will be understood by one of ordinary skill in the art that various changes in form and details may be made therein without departing from the scope as defined by the following claims.

It will be understood by one of ordinary skill in the art that when terms indicating directions such as upper, lower, left, and right, are used, these terms are only for convenience of explanation and may vary according to a position of a target object, a position of an observer, etc.

What is claimed is:

1. A connector for large current comprising:
    a terminal member capable of large current transmission;
    a connector housing in which the terminal member is accommodated;
    at least one temperature sensor attached to the terminal member;
    a fan unit provided in the connector housing, and configured to operate when a temperature of the terminal member is higher than a preset threshold temperature; and
    an exhaust cover provided on a side of the connector housing, and configured to be opened/closed by wind pressure when the fan unit operates, wherein the exhaust cover is connected to a damper hinge configured to generate a bias in a direction in which the exhaust cover is closed, wherein the bias exerts a force that is less than a force generated by the wind pressure when the fan unit is at a lowest speed.

2. The connector for large current of claim 1, further comprising a controller connected to the temperature sensor, and the fan unit, and wherein the controller is configured to turn on/off the fan unit based on temperature data sensed by the temperature sensor located in the connector housing.

3. The connector for large current of claim 2, wherein the controller is further configured to, in response to a temperature of the terminal member reaching aa threshold temperature predefined as a dangerous level, transmit a warning sound or a danger signal to an external device.

4. The connector for large current of claim 2, wherein the controller is implemented as a printed circuit board.

5. The connector for large current of claim 2, wherein the connector housing comprises:
    a bottom cover comprising a space in which the terminal member and the fan unit under the terminal member are provided; and
    a top cover coupled to the top of the bottom cover and having an inner surface on which the controller is fixedly mounted.

6. The connector for large current of claim 5, further comprising an indicator light electrically connected to the controller, located in a hole formed in the top cover, and configured to indicate a temperature state of the terminal member.

7. The connector for large current of claim 5, wherein the bottom cover comprises a ventilation hole in a portion corresponding to a lower portion of the fan unit, and the exhaust cover is configured to cover the ventilation hole.

8. The connector for large current of claim 7, wherein the exhaust cover is coupled to the bottom cover with the damper hinge.

9. The connector for large current of claim 7, further comprising a suction member provided in an outer portion of the ventilation hole where an edge of the exhaust cover contacts the bottom cover.

10. A battery pack comprising the connector for large current according to claim 1.

* * * * *